(12) United States Patent
Ye et al.

(10) Patent No.: US 12,156,239 B2
(45) Date of Patent: Nov. 26, 2024

(54) SIDELINK CO-CHANNEL COEXISTENCE WITH INTER-UE COORDINATION

(71) Applicant: APPLE INC., Cupertino, CA (US)

(72) Inventors: Chunxuan Ye, San Diego, CA (US); Chunhai Yao, Beijing (CN); Dawei Zhang, Cupertino, CA (US); Haitong Sun, Cupertino, CA (US); Hong He, Cupertino, CA (US); Huaning Niu, Cupertino, CA (US); Oghenekome Oteri, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,392

(22) PCT Filed: Sep. 2, 2021

(86) PCT No.: PCT/CN2021/116251
§ 371 (c)(1),
(2) Date: Sep. 17, 2021

(87) PCT Pub. No.: WO2023/028952
PCT Pub. Date: Mar. 9, 2023

(65) Prior Publication Data
US 2024/0032075 A1 Jan. 25, 2024

(51) Int. Cl.
*H04W 72/40* (2023.01)
*H04W 28/26* (2009.01)

(52) U.S. Cl.
CPC ........... *H04W 72/40* (2023.01); *H04W 28/26* (2013.01)

(58) Field of Classification Search
CPC ................................. H04W 4/14; H04W 24/10
See application file for complete search history.

(56) References Cited

U.S. PATENT DOCUMENTS

| 2021/0204307 | A1* | 7/2021 | Lee | H04W 76/14 |
| 2022/0095280 | A1* | 3/2022 | Farag | H04L 1/1678 |

(Continued)

FOREIGN PATENT DOCUMENTS

| CN | 112823561 A | 5/2021 |
| WO | 2021098483 A1 | 5/2021 |

OTHER PUBLICATIONS

Interdigital, Inc., "In-device Coexistence between LTE and NR V2X Sidelinks", R1-1912741, 3GPP TSG RAN WG1 #99, Reno, Nevada, USA, Agenda Item 7.2.4.4, Nov. 18-22, 2019, 2 pages.

(Continued)

*Primary Examiner* — Zhiren Qin
(74) *Attorney, Agent, or Firm* — Dorsey & Whitney LLP

(57) ABSTRACT

Systems and methods for utilizing inter-UE coordination regarding reserved resources of a sidelink (SL) resource pool are described herein. A first user equipment (UE) may identify that a first SL resource pool on a first radio access technology (RAT) overlaps with a second SL resource pool on a second RAT, sense for reservation signaling on the second SL resource pool to determine reserved resources on the second SL resource pool, and transmit resource reservation information indicating those reserved resources on SL on the first RAT. A second UE may receive the resource reservation information on the SL, identify, within the first SL resource pool, corresponding resources that overlap with the reserved resources of the second SL resource pool, select, from the first SL resource pool, transmission resources to use for a SL transmission by prioritizing resources other than the corresponding resources; and per- (Continued)

form the SL transmission using those transmission resources.

18 Claims, 7 Drawing Sheets

(56) References Cited

U.S. PATENT DOCUMENTS

2022/0095366 A1* 3/2022 Lee .................. H04W 28/0278
2022/0224497 A1* 7/2022 Li .................... H04W 74/0808
2023/0037535 A1* 2/2023 Luo ..................... H04W 72/20

OTHER PUBLICATIONS

Interdigital, Inc., "In-device Coexistence between LTE and NR V2X Sidelinks", R1-1911279, 3GPP TSG RAN WG1 #98bis, Chongqing, China, Agenda Item 7.2.4.4, Oct. 14-20, 2019, 3 pages.
OPPO, "Discussions on NR and Lte V2X in-device coexistence", R1-1904923, 3GPP TSG-RAN WG1 Meeting #96bis, Xi'an, China, Agenda Item 7.2.4.4, Apr. 8-12, 2019, 4 pages.
PCT/CN2021/116251, International Search Report and Written Opinion, Apr. 26, 2022, 9 pages.
VIVO, "On coexistence of NR and LTE sidelink for V2X", R1-1812311, 3GPP TSG RAN WG1 Meeting #95, Spokane, Washington, USA, Agenda Item 7.2.4.5, Nov. 12-16, 2018, 4 pages.

* cited by examiner

SIDELINK CO-CHANNEL COEXISTENCE WITH INTER-UE COORDINATION

TECHNICAL FIELD

This application relates generally to wireless communication systems, including such systems having user equipment (UE) that implement sidelink (SL) communications in areas/circumstances where multiple SL resource pools of multiple radio access technologies (RATs) may overlap.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
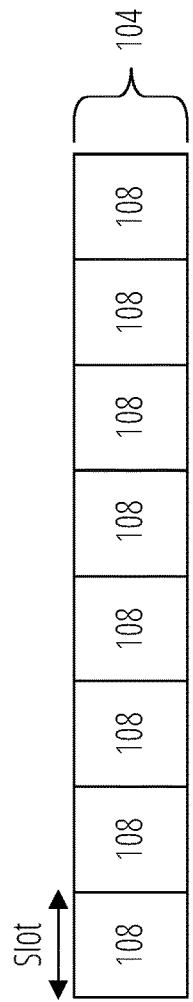
FIG. 1 illustrates a diagram showing co-channel coexistence between an NR SL resource pool and an LTE SL resource pool, according to an embodiment
Figure 1:
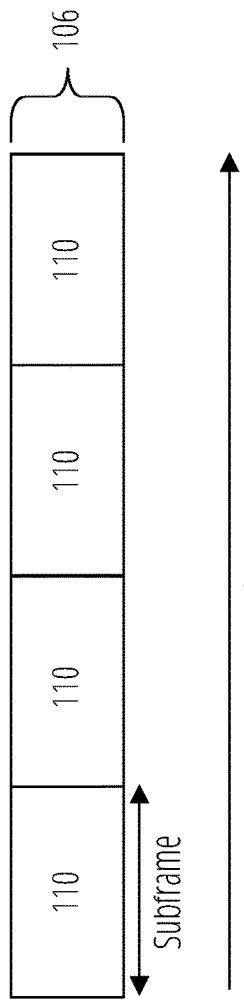

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

UEs may operate using sidelink (SL), whereby a UE communicates with another (peer) UE using signaling sent from one of the UE directly to the other of the UE (e.g., without any intermediate device relaying those signals between the UE). A UE may use or implement a type of SL that corresponds to one or more RATs used by the UE. For example, a UE may be able to use or implement one or more of an NR SL, an LTE SL, etc. One example of an NR SL may be NR vehicle-to-everything (V2X) SL, and an example of an LTE SL may be LTE V2X SL.

Note that while embodiments disclosed herein may illustrate their corresponding principles using descriptions of SL on particular RAT types (e.g., NR RAT, LTE RAT), the particular RAT types used in such examples should be understood to be provided by way of example and not by way of limitation. Persons of ordinary skill in the art will understand that the principles discussed herein could be implemented relative to an environment using RAT type(s) other than those particularly provided for by way of example in the description of any given embodiment herein.

Considerations of co-channel coexistence between SL mechanisms of multiple RATs are discussed herein. SL communications may be performed using one or more resources from a SL resource pool corresponding to the RAT type of the SL communication taking place. In some cases, it may be that a first resource pool used by UEs for LTE SL may overlap (in time and frequency) at least in part with a resource pool used by the UEs found in the same general geographical region for NR SL. In other words, the NR SL resource pool and the LTE SL resource pool may be in a state of "co-channel coexistence." As one example: in at least some regions, there may be a current proliferation of LTE enabled UE that may accordingly use LTE SL on an LTE SL resource pool, while at the same time the region experiences an increase in the use of NR enabled UE (which may be the same and/or different UE) that may accordingly use NR SL on an NR SL resource pool that is at least partially overlapped in time and frequency with the LTE SL resource pool. It may thus be that the overlapped portions of the SL resource pools of the different RATs can be said to interfere or collide with each other at the physical level, in the sense that it is possible that SL transmissions (e.g., from different UEs) that happen to simultaneously occur on the different RATs using any overlapped resources of the overlapped SL resource pools and in the same area may interfere or collide.

In some embodiments, as used herein, reference to a portion of a first SL resource pool that is overlapped by a second SL resource pool may be understood to refer to only resources of the first SL resource pool that are actually overlapped by the second SL resource pool. Similarly, in some embodiments, as used herein, it may be understood that when a portion of a first resource pool is described to overlap with a portion of a second SL resource pool, these portions (of each SL resource pool) may include only resources of their respective SL resource pool that are actually overlapped by resources of the other SL resource pool.

NR SL may allocate or schedule resources according to one of multiple possible modes. In a Mode 1 resource allocation scheme for NR SL, a network of the wireless communication system is responsible for coordinating the scheduling of SL resources of an NR SL resource pool that are used by one or more UE to perform sidelink operations (SL transmission and/or SL reception).

In a Mode 2 resource allocation scheme for NR SL, a UE may schedule resources of an NR SL resource pool for its own use. Accordingly, when operating in a Mode 2 resource allocation scheme, there may be no network (e.g., base station-supplied) coordination for the allocation, scheduling, or use of resources of the NR SL resource pool by the UE. In such cases, it may be beneficial to configure one UE to provide coordination information to another UE over SL using an inter-UE coordination process. For example, a first UE may provide coordination information that indicates a determination that the first UE has made about one or more resources of a SL resource pool to a second UE. This coordination information may be, for example, information regarding use by (third) peer UE(s) of the one or more resources as determined by sensing performed at the first UE that is then transmitted from the first UE to the second UE (e.g., on SL). The second UE may then take this coordination information into account when performing its own SL operations (e.g., when performing resource selection for its own SL transmissions). In such a case, the first UE (generating and providing the coordination information) may be referred to as a "helper" UE, while the second UE (receiving and using the coordination information) may be understood to be a "transmitting" UE.

Multiple inter-UE coordination schemes are contemplated. A first inter-UE coordination scheme may be a proactive scheme. For example, a helper UE may proactively (e.g., be configured or pre-configured to) provide coordination information to a transmitting UE (e.g., without receiving an explicit trigger to do so). Such coordination may include an indication of one or more preferred resources and/or one or more non-preferred resources for the transmission by the transmitting UE (e.g., as determined by sensing performed at the helper UE to detect resource use by peer UE(s)). In such cases, it may be that there is a possibility of down-selection between a preferred resource set and a non-preferred resource set, and/or there may be additional information in the coordination information beyond a time/frequency indication(s) of resources within the set being reported on by the coordination information.

A second inter-UE coordination scheme may be a reactive scheme. For example, coordination information may be sent from a helper UE to a second UE when the helper UE determines that there is an expected, potential, or detected resource conflict on resource(s) to be used by the second UE. This existence of the resource conflict may be determined at the helper UE by referring to sidelink control information (SCI) sent by the transmitting UE and received at the helper UE that informs the helper UE of future resources to be used by the transmitting UE for transmission. This information is compared with information regarding resource use (e.g., by peer UE(s)) as sensed at the helper UE to determine the existence of the (expected, potential, detected) resource conflict. Coordination information indicating the existence of the (expected, potential, detected) resource conflict is then sent by the helper UE to the transmitting UE. In such cases, there may be a possibility of down-selection between a detected or potential conflict and the detected resource conflict.

It may be beneficial to use inter-UE coordination methods described herein to improve UE operation in a co-channel coexistence setting. In other words, it may be beneficial to use inter-UE coordination methods between a helper UE and a transmitting UE to alleviate potential problems that stem from the existence and/or use of multiple SL resource pools of multiple RAT types in the same overlapping physical area.

FIG. 1 illustrates a diagram 102 showing co-channel coexistence between an NR SL resource pool 104 and an LTE SL resource pool 106, according to an embodiment. As illustrated, the NR SL resource pool 104 and the LTE SL resource pool 106 overlap in time. Further, it should also be understood that the NR SL resource pool 104 and the LTE SL resource pool 106 overlap (at least in part) in frequency as well (even though the NR SL resource pool 104 has been illustrated above the LTE SL resource pool 106).

In the diagram 102, each slot 108 of the NR SL resource pool 104 is overlapped by a subframe 110 of the LTE SL resource pool 106, as indicated. Accordingly, the diagram 102 may be understood to constitute a "full overlap" (in time) from the perspective of the NR SL resource pool 104.

Figure 2:
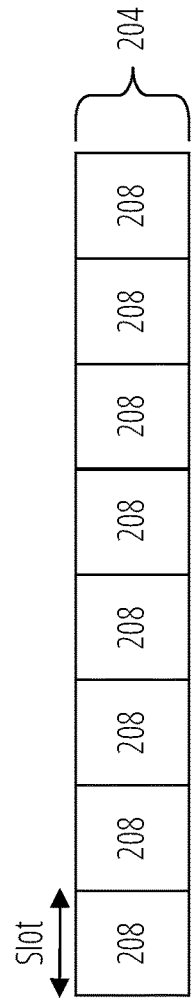
FIG. 2 illustrates a diagram showing co-channel coexistence between an NR SL resource pool and an LTE SL resource pool, according to an embodiment.
Figure 2:
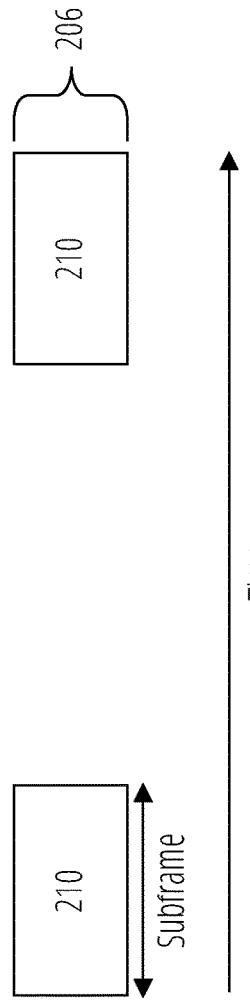

FIG. 2 illustrates a diagram 202 showing co-channel coexistence between an NR SL resource pool 204 and an LTE SL resource pool 206, according to an embodiment. As illustrated, the NR SL resource pool 204 and the LTE SL resource pool 206 overlap in time. Further, it should also be understood that the NR SL resource pool 204 and the LTE SL resource pool 206 overlap (at least in part) in frequency as well (even though the NR SL resource pool 204 has been illustrated above the LTE SL resource pool 206).

In the diagram 202, some of the slots 208 of the NR SL resource pool 204 are overlapped by a subframe 210 of the LTE SL resource pool 206, while other slots slot 208 of the NR SL resource pool 204 are not overlapped by a subframe 210 of the LTE SL resource pool 206, as illustrated. Accordingly, the diagram 202 may be understood to constitute a "partial overlap" (in time) from the perspective of the NR SL resource pool 104.

In co-channel coexistence cases (such as those illustrated in FIG. 1 and FIG. 2), it may be that the different RAT types use different waveforms and/or channel codings on their respective SL channels. For example, it may be that an NR physical sidelink control channel (PSCCH) and/or physical sidelink shared channel (PSSCH) use different waveforms than those used for, respectively, LTE PSCCH and/or PSSCH. In such cases, a UE configured to detect LTE SL signaling (e.g., LTE PSCCHs) may not therefore be inherently capable of detecting similar NR signaling (e.g., may not inherently be capable of detecting NR PSCCHs), and vice-versa.

For example, there may be UEs capable of using an LTE SL resource pool, but that cannot detect resource reservation signaling on an NR SL resource pool. Examples of such UEs may be some UEs as defined in 3GPP Release 14 or Release 15. There may also be UEs capable of using an NR SL resource pool, but that cannot detect resource reservation signaling on an LTE SL resource pool. Examples of such UEs may be some UEs as defined in 3GPP Release 16 or Release 17.

Other UEs may be capable of both using a first SL resource pool of a first RAT type and a second SL resource pool for a second RAT type (where, the use of the second SL resource pool includes at least the ability to detect resource reservations on the second SL resource pool). For example, a helper UE may be capable of using NR SL on an NR SL resource pool. Further, the helper UE may be capable of (at least) detecting resource reservations on and LTE SL resource pool from UEs using LTE SL. It is contemplated that in such cases, the helper UE, after detecting resource reservations on the LTE SL resource pool, could send coordination information (that includes information about the resources on the LTE SL resource pool that have been reserved on the LTE SL resource pool) on NR SL to transmitting UE(s) that may not themselves be capable of detecting resource reservations on the LTE SL resource pool. This information could then be used by the transmitting UE(s) to, for example, select and/or prioritize the selection of resources on the NR SL resource pool that do not overlap the reserved resources on the LTE SL resource pool (thereby avoiding collisions with transmissions on the LTE SL resource pool).

Figure 3:
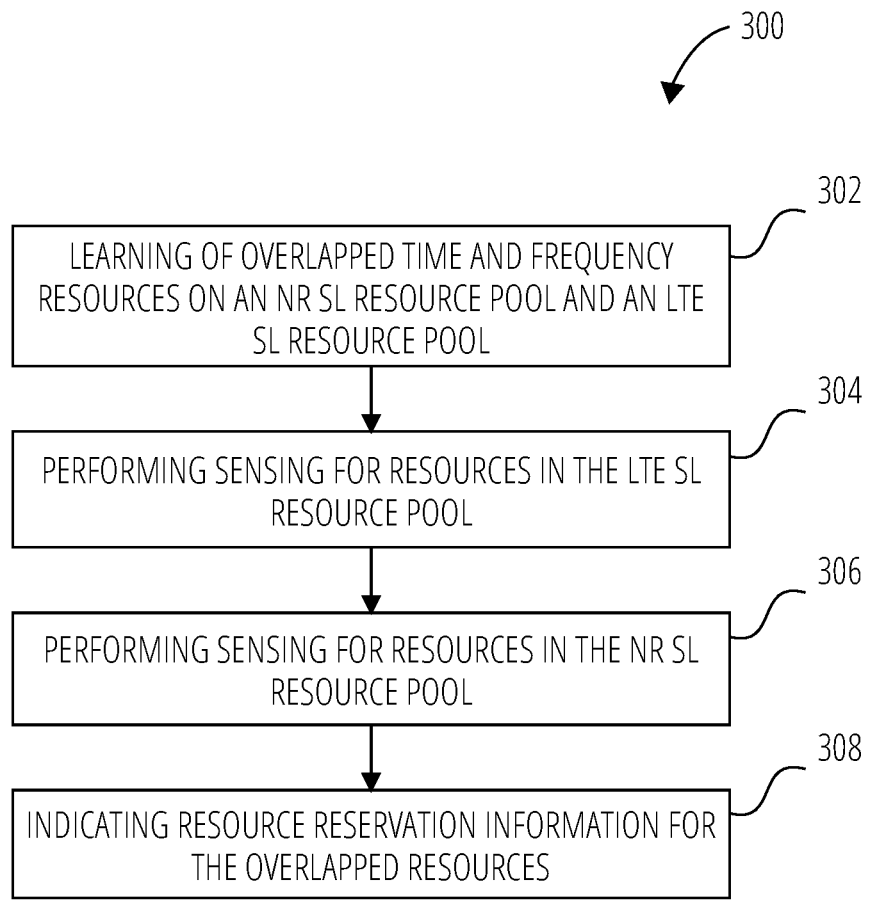
FIG. 3 illustrates a method of a UE, according to an embodiment.

FIG. 3 illustrates a method 300 of a UE, according to an embodiment. The UE of FIG. 3 may be a helper UE. The method 300 includes learning 302 of overlapped time and frequency resources on an NR SL resource pool and an LTE SL resource pool. For example, configuration information for the NR SL resource pool that is provided to the UE and/or pre-configured to the UE may indicate the location(s) of the overlapped portion(s) of the NR SL resource pool and/or the LTE SL resource pool. Alternatively, the UE may be provided and/or be pre-configured with configuration information for each of the NR SL resource pool and the LTE SL resource pool, and may use this information to itself determine the location(s) of the overlapped portion(s) of the NR resource pool and/or the LTE SL resource pool. Accordingly, the UE may be aware that there is a chance of collision between transmissions on overlapped resources from the SL resource pool for each RAT, as described above.

The method 300 further includes performing 304 sensing for resources in the LTE SL resource pool. It may be, for example, that the UE senses for reservation signaling (e.g., as part of SCI in PSCCH) sent by peer UEs during one or more of the resources of the LTE SL resource pool. This reservation signaling may have been sent during a sensing window corresponding to the SL resource pool. Reservation signaling for a given resource may be monitored for at location(s) on the LTE SL resource pool corresponding to resource reservation period for that resource that is found in resource pool configuration information for the LTE SL resource pool.

The method 300 further includes performing 306 sensing for resources in the NR SL resource pool. It may be, for example, that the UE senses for reservation signaling (e.g., as part of SCI in PSCCH) sent by peer UEs during one or more of the resources of the NR SL resource pool. This reservation signaling may have been sent during a sensing window corresponding to the SL resource pool. Reservation signaling for a given resource may be monitored for at location(s) on the NR SL resource pool corresponding to resource reservation period for that resource that is found in resource pool configuration information for the NR SL resource pool. The performing 306 of the sensing for resources in the NR SL resource pool may be preparatory to NR SL transmissions by the UE. In some cases (e.g., in cases where the UE is configured to use random resource selection on the NR SL resource pool for NR SL transmission), the performing 306 of the sensing for resources in the NR SL resource pool may not be performed.

It should be understood that the performing 304 of sensing for resources in the LTE SL resource pool and the performing 306 of sensing for resources in the NR SL resource pool may occur simultaneously (at least in part). This may reflect a case where resource allocations schemes for each of the LTE SL resource pool and the NR SL resource pool may use similar general timing principles, such that relevant reservation signaling for scheduling overlapped resources on each of the NR SL resource pool and the LTE SL resource pool can occur during the same general time period. Accordingly, it is anticipated that a UE implementing the method 300 is capable of performing sensing for resources in the NR SL resource pool and the LTE SL resource pool at the same time.

The method 300 further includes indicating 308 resource reservation information for the overlapped resources. The resource reservation information may include information about resources on the LTE SL resource pool that have been reserved. In some embodiments, the UE may be a helper UE, and the resource reservation information may be transmitted on NR SL (using one or more resources of the NR SL resource pool) as (or as part of) coordination information sent by the helper UE, as described herein.

The range of resources detected on the LTE SL resource pool during the performing 304 of sensing for resources in the LTE SL resource pool is now discussed. In some embodiments, the UE may sense for reservation signaling in the entire LTE SL resource pool to detect resource reservations within the LTE SL resource pool. With that information the UE may then identify reserved resources of the LTE SL resource pool that overlap with the NR SL resource pool. This embodiment may be considered comprehensive, in that by sensing for reservation signaling in the entire LTE SL resource pool, the UE can fully identify all reserved resources of the LTE SL resource pool.

Alternatively, it may be that the UE senses for reservation signaling in the portion of the LTE SL resource pool that is overlapped with the NR SL resource pool to detect resource reservations within the LTE SL resource pool. With that information the UE may then identify reserved resources of the LTE SL resource pool that overlap with the NR SL resource pool. This embodiment may be less comprehensive than the case where the UE senses for reservation signaling in the entire LTE SL resource pool. For example, it may be that reservation signaling for a resource in the overlapped portion of the LTE SL resource pool occurs in a the portion of the LTE SL resource pool that is not overlapped. In such a case, the UE may not ultimately become aware of the reservation of the overlapped resource. However, this embodiment may use less power, transmission, and/or computational resources than the case where the UE senses for reservation signaling in the entire LTE SL resource pool.

Triggering conditions for the method 300 are now discussed. In some embodiments, the UE may repeatedly perform the method 300 (e.g., always be engaged in performing/attempting to perform the method 300). In such circumstances, there may be no specific triggering condition for any one such iteration of the method 300.

In other embodiments, it may be that the UE performs the method 300 according to instructions provided in configuration information for a SL resource pool used by the UE. For example, it may be that configuration information for an NR SL resource pool may instruct all UE with the identified capability (e.g., the capability to execute each of the performing 304 of the of sensing for resources in the LTE SL resource pool and the performing 306 of sensing for resources in the NR SL resource pool in the manner described above) to perform the method 300, and the performance by the UE of the method 300 relative to that NR SL resource pool may be a result of this instruction. As such, it may be said that a transmission of resource reservation information indicating the reserved LTE SL resources may be in response to a resource pool configuration for a NR SL resource pool.

In other embodiments, the UE's performance of the method 300 may be triggered by a peer UE (e.g., the transmitting UE). For example, a PC5-radio resource control (RRC) configuration with/established by a peer UE on NR SL may indicate that the UE should perform the method 300. In another example, the peer UE may provide SCI that indicates that the UE should perform the method 300. As such, it may be said that a transmission of resource reservation information indicating the reserved LTE SL resources may be in response to one of a PC5-RRC configuration or an SCI. The peer UE may be the transmitting UE in some embodiments.

Transmission details for the resource reservation information are now discussed. In some embodiments, the resource reservation information may be transmitted (e.g., broadcast) according to a periodicity known to the UE. In other embodiments, the resource reservation information may be transmitted in response to a trigger from a peer UE.

Contents of the resource reservation information are now discussed. The resource reservation information includes information about resources on the LTE SL resource pool that have been reserved (e.g., as determined during the performing 304 of sensing for resources in the LTE SL resource pool). In some embodiments, the resource reservation information may include information about whether or not resources of the entire LTE SL resource pool are reserved. In other embodiments, the resource reservation information may include (only) information about whether or not resources of the LTE SL resource pool that are overlapped by the NR SL resource pool are reserved. In some embodiments, the resource reservation information may also include information about resources on the NR SL resource pool that have been reserved (e.g., as determined during any performing 306 of sensing for resources in the NR SL resource pool).

SL resources used to indicate or transmit the resource reservation information are now discussed. The resource reservation information may be transmitted using NR SL resources corresponding to a PSCCH and/or a PSSCH. The resource reservation information may be provided in the form of inter-UE coordination (e.g., as coordination information, as described above). In some embodiments, it may be that the resource reservation information is transmitted on resources of the NR SL resource pool that are not overlapped with the LTE SL resource pool. This may help to avoid the case where the transmission of the resource reservation information on the NR SL itself has the potential to collide with a transmission on the LTE SL resource pool. Accordingly, this may occur in cases where there is a partial overlap between the NR SL resource pool and the LTE SL resource pool (and thus there are non-overlapped resources on the NR SL resource pool that can be so used).

In other embodiments, it may be that the resource reservation information is transmitted on any resource of the NR SL resource pool. This may occur in cases where, for example, there is a full overlap between the NR SL resource pool and the LTE SL resource pool (and thus there are no non-overlapped resources in the NR SL resource pool).

The selection of resources of the NR SL resource pool that are used to transmit the resource reservation information are now discussed. In a first embodiment, it may be that the UE uses resources of the NR SL resource pool that are dedicated for transmitting the resource reservation information from the UE. These resources may be configured (or pre-configured) according to configuration information for the NR SL resource pool.

In another embodiment, the UE may dynamically select resources of the NR SL resource pool to use to transmit the resource reservation information. When dynamically selecting transmission resources of the NR SL resource pool for this purpose, it may be that the selection process used takes into account a priority of the data to be sent, with higher priority data being more likely to receive transmission resources. The priority level used by the resource reservation information for this purpose may be pre-configured relative to the NR SL resource pool (e.g., set by configuration for the NR SL resource pool). In alternative embodiments, the priority level of the resource reservation information may be pre-defined (e.g., by a standard that controls the behavior of the wireless communication system in which the UE operates). In such cases, it may be that the resource reservation information is pre-defined to a highest priority level.

Data formatting for the resource reservation information is now discussed. In some embodiments, the resource reservation information uses a resource bitmap to indicate which resources of the LTE SL resource pool are reserved. This resource bitmap may be two dimensional. In a first dimension corresponding to the time domain, each bit may represent a 1 ms subframe of the LTE RAT, with the 1 ms subframe defining the time of a single LTE SL resource. This first dimension may extend to cover resources of the LTE SL resource pool falling within a window or time period of interest for the resource reservation information. This window length may be configured or pre-configured to the UE according to configuration information for the NR SL resource pool. In a second dimension corresponding to the frequency domain, each bit may represent a sub-channel, with the sub-channel defining the frequency coverage of a single LTE SL resource.

Each bit in the resource bitmap may indicate whether or not the LTE SL resource corresponding to that bit has been reserved by a peer UE on the LTE SL resource pool. For example, a "0" bit might represent that the resource is not reserved, while a "1" bit may indicate that the resource is reserved. The bitmap include bits for all resources across the entire LTE SL resource pool within the window, or in alternative embodiments may include bits only for resources of the LTE SL resource pool within the window that are overlapped by the NR SL resource pool A bit sequence in the resource bitmap may organized such that the time domain receives first order treatment while the frequency domain receives second order treatment. Alternatively, a bit sequence in the resource bitmap may organized such that the frequency domain receives first order treatment while the time domain receives second order treatment.

Various manners of signaling or indicating the existence and/or location of resource reservation information to a peer UE (e.g., a transmitting UE) are now discussed. In some embodiments, stage 1 SCI may include a reserved bit that can be used to indicate whether a PSSCH corresponding to that stage 1 SCI includes the resource reservation information. By decoding this stage 1 SCI, the peer UE is informed of the resource reservation information in the corresponding PSSCH.

In other embodiments, stage 2 SCI (e.g., stage 2-A SCI or stage 2-B SCI) may include a bit that can be used to indicate whether a PSSCH corresponding to that stage 2 SCI includes the resource reservation information. By decoding this stage 2 SCI, the peer UE is informed of the resource reservation information in the corresponding PSSCH.

In other embodiments, a particular medium access control control element (MAC CE) format may be used to indicate that a PSSCH corresponding to that MAC CE includes the resource reservation information. By decoding a MAC CE of the particular format, the peer UE is informed of the resource reservation information in the corresponding PSSCH. This embodiment may be appropriate in the case that SL unicast methods between the UE and the peer UE are being used.

Figure 4:
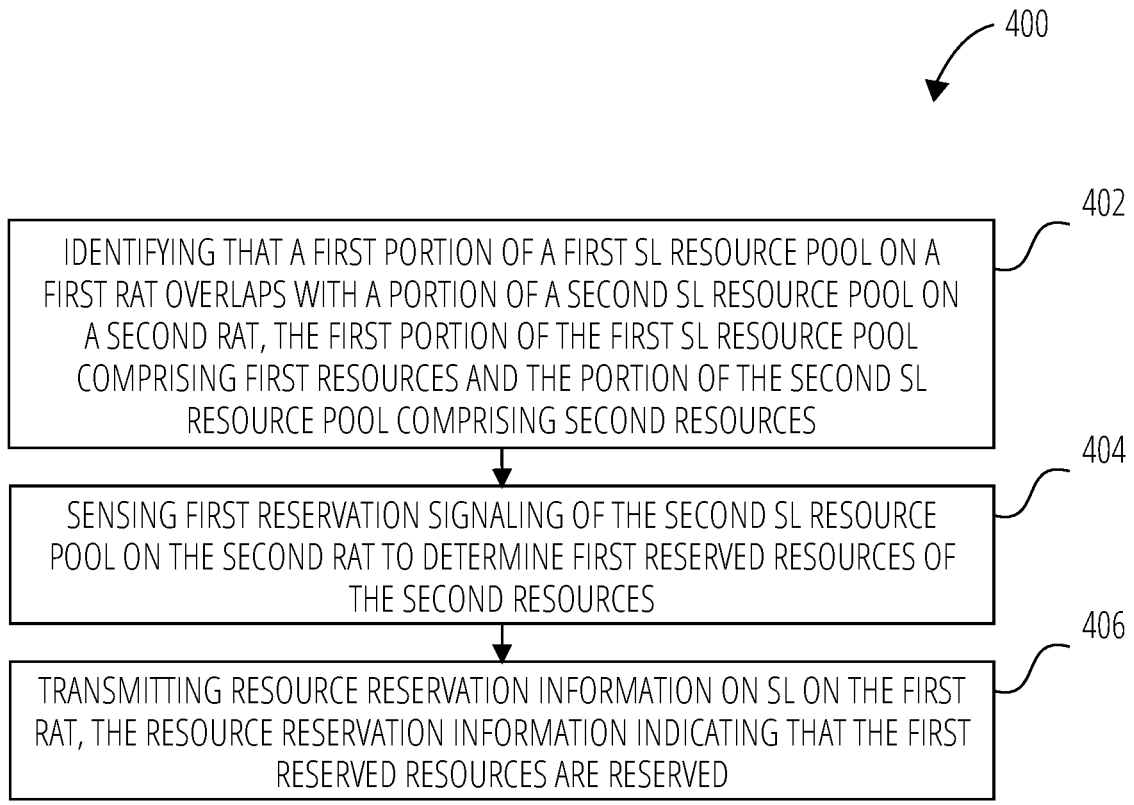
FIG. 4 illustrates a method of a UE, according to an embodiment.

FIG. 4 illustrates a method 400 of a UE, according to an embodiment. The method 400 includes identifying 402 that a first portion of a first SL resource pool on a first RAT overlaps with a portion of a second SL resource pool on a second RAT, the first portion of the first SL resource pool comprising first resources and the portion of the second SL resource pool comprising second resources.

The method 400 further includes sensing 404 first reservation signaling of the second SL resource pool on the second RAT to determine first reserved resources of the second resources.

The method 400 further includes transmitting 406 resource reservation information on SL on the first RAT, the resource reservation information indicating that the first reserved resources are reserved.

In some embodiments, the method 400 further includes sensing second reservation signaling of the first SL resource pool on the first RAT to determine second reserved resources from the first SL resource pool; wherein the resource reservation information further indicates that the second reserved resources are reserved.

In some embodiments of the method 400, the first reservation signaling comprises reservation signaling of only the portion of the second SL resource pool.

In some embodiments of the method 400, the resource reservation information is transmitted when a resource pool configuration for the first SL resource pool indicates that the UE should transmit the resource reservation information.

In some embodiments of the method 400, the resource reservation information is transmitted in response to a trigger provided by a peer UE using SL on the first RAT, the trigger being provided as of one of a PC5 RRC configuration and SCI.

In some embodiments of the method 400, the resource reservation information is transmitted according to a periodicity known to the UE.

In some embodiments of the method 400, the resource reservation information is transmitted in response to a trigger from a peer UE.

In some embodiments of the method 400, the resource reservation information is transmitted on one or more resources of a second portion of the first SL resource pool that does not overlap with the second SL resource pool.

In some embodiments of the method 400, the resource reservation information is transmitted on one or more dedicated resources of the first SL resource pool.

In some embodiments of the method 400, the resource reservation information is transmitted on one or more dynamically selected resources of the first SL resource pool. In some such embodiments, the resource reservation information is of a priority level that is pre-configured relative to the first SL resource pool. In other such embodiments, the resource reservation information is of a pre-defined priority level.

In some embodiments of the method 400, the resource reservation information uses a resource bitmap to indicate that the first reserved resources are reserved, wherein a bit of the resource bitmap corresponds to a time of one of the second resources on the second RAT and a frequency of the one of the second resources on the second RAT. In some such embodiments, the resource bitmap includes only bits for the second resources that occur during a window of a length that is defined in configuration information for the first SL resource pool.

In some embodiments of the method 400, the resource reservation information is transmitted in a PSSCH, and the method 400 further includes transmitting an indication that the PSSCH comprises the resource reservation information. In some such embodiments, the indication is transmitted in stage 1 SCI corresponding to the PSSCH. In other such embodiments, the indication is transmitted in stage 2 SCI corresponding to the PSSCH. In other such embodiments, the indication is transmitted in a MAC CE corresponding to the PSSCH.

Embodiments contemplated herein include an apparatus comprising means to perform one or more elements of the method 400. This apparatus may be, for example, an apparatus of a UE (such as a first wireless device 802 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 806 of a first wireless device 802 that is a UE, as described herein).

Embodiments contemplated herein include an apparatus comprising logic, modules, or circuitry to perform one or more elements of the method 400. This apparatus may be, for example, an apparatus of a UE (such as a first wireless device 802 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a first wireless device 802 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 804 of a first wireless device 802 that is a UE, as described herein). These instructions may be, for example, located in the processor and/or on a memory of the UE (such as a memory 806 of a first wireless device 802 that is a UE, as described herein).

Figure 5:
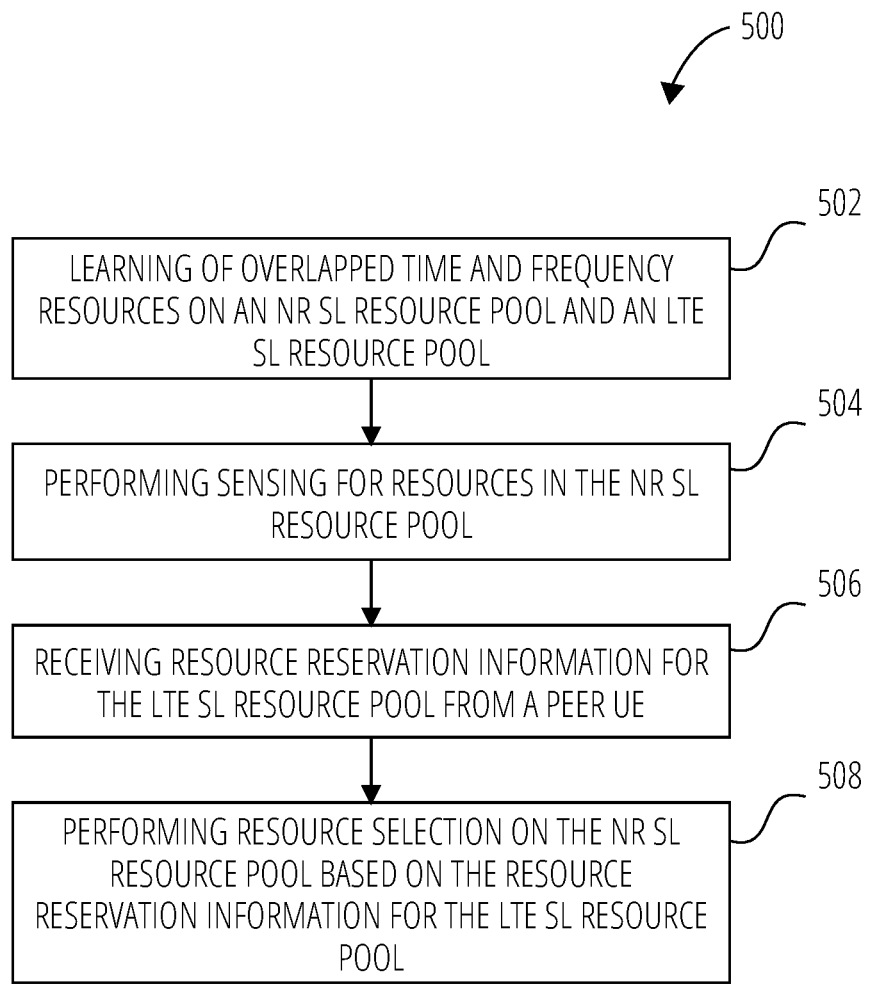
FIG. 5 illustrates a method of a UE, according to an embodiment.

FIG. 5 illustrates a method 500 of a UE, according to an embodiment. The UE of FIG. 5 may be a transmitting UE. The method 500 includes learning 502 of overlapped time and frequency resources on an NR SL resource pool and an LTE SL resource pool. For example, configuration information for the NR SL resource pool that is provided to the UE and/or pre-configured to the UE may indicate the location(s) of the overlapped portion(s) of the NR SL resource pool and/or the LTE SL resource pool. Alternatively, the UE may be provided and/or be pre-configured with configuration information for each of the NR SL resource pool and the LTE SL resource pool, and may use this information to itself determine the location(s) of the overlapped portion(s) of the NR resource pool and/or the LTE SL resource pool. Accordingly, the UE may be aware that there is a chance of collision between transmissions on overlapped resources from the SL resource pool for each RAT, as described above.

The method 500 further includes performing 504 sensing for resources in the NR SL resource pool. It may be, for example, that the UE senses for reservation signaling (e.g., as part of SCI in PSCCH) sent by peer UEs during one or more of the resources of the NR SL resource pool. This reservation signaling may have been sent during a sensing window corresponding to the SL resource pool. Reservation signaling for a given resource may be monitored for at location(s) on the NR SL resource pool corresponding to resource reservation period for that resource that is found in resource pool configuration information for the NR SL resource pool.

The method 500 further includes receiving 506 resource reservation information for the LTE SL resource pool from a peer UE. The peer UE may be a helper UE as previously described. The resource reservation information may be received from the peer UE using NR SL communications on the NR SL resource pool. The resource reservation information indicates reserved resources of the LTE SL resource pool, according to the manner previously described herein. The resource reservation information may be further arranged and/or comprised in any manner described herein.

The method 500 further includes performing 508 resource selection on the NR SL resource pool based on the resource reservation information for the LTE SL resource pool. Resources so selected are then used to perform a SL transmission on the NR SL resource pool. This resource selection may prioritize resources on the NR SL resource pool that do not overlap with resources of the LTE SL resource pool that are being used for LTE SL transmission. In some cases, the prioritization of these resources may be implemented by the UE by the UE not selecting any resources on the NR SL resource pool that overlap with resources of the LTE SL resource pool that are being used for LTE SL transmission.

Details associated with the receipt of the resource reservation information will now be described. In some embodiments, the resource reservation information may be received based on a periodicity for transmitting such information that is used by the peer UE. In other embodiments, the UE may send the peer UE a trigger to provide the resource reservation information, and the resource reservation information may be received (e.g., from the peer UE) as provided in response to that trigger. The trigger may be provided as one of a PC5 RRC configuration and SCI. It may be that the UE determines whether to send the trigger to the peer UE based on a priority of data to be transmitted on the SL transmission on the NR SL resource pool.

Details regarding cross-RAT convergence of data will now be described. The resource reservation information received at the UE as part of the method 500 may be indicated in terms of subframes and sub-carriers from the perspective of the LTE RAT, in the manner previously described. It may be that these resources do not neatly align with the resources of the NR SL resource pool (which may be understood in terms of a slot length that is not necessarily the same as the LTE subframe length, and that itself can vary based on an (also variable) sub-carrier spacing applicable to the NR resources). Accordingly, as part of the method 500, it should be understood that the UE may identify resources of the NR SL resource pool that correspond to the reserved resources on the LTE SL resource pool (as reported in the resource reservation information) by accounting for these differences. Then, the UE may perform resource selection in the NR SL resource pool based on the resource reservation information by leveraging its understanding of these corresponding resources of the NR SL resource pool (e.g., by prioritizing the selection of resources of the NR SL resource pool that are not those corresponding resources).

Figure 6:
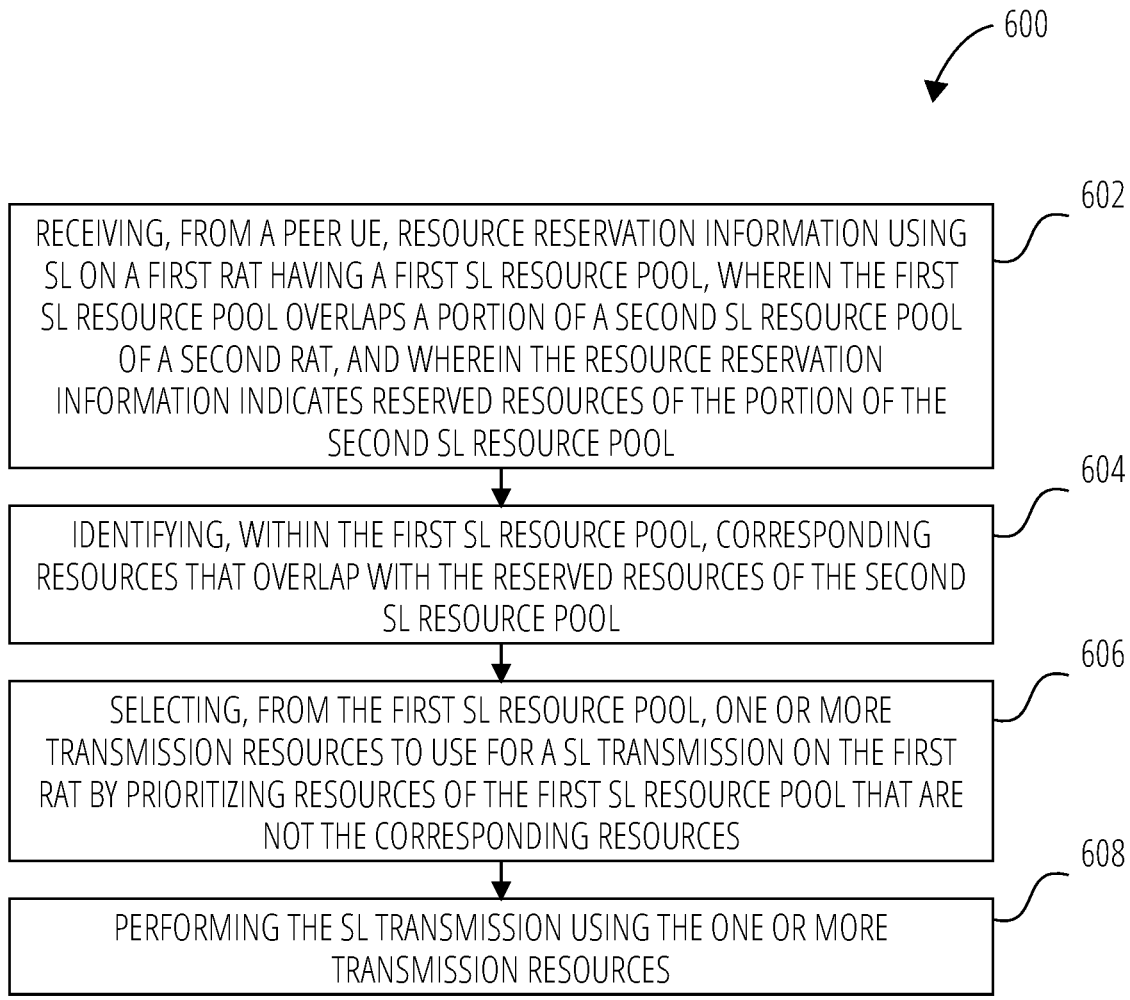
FIG. 6 illustrates a method of a UE, according to an embodiment.

FIG. 6 illustrates a method 600 of a UE, according to an embodiment. The method 600 includes receiving 602, from a peer UE, resource reservation information using SL on a first RAT having a first SL resource pool, wherein the first SL resource pool overlaps a portion of a second SL resource pool of a second RAT, and wherein the resource reservation information indicates reserved resources of the portion of the second SL resource pool.

The method 600 further includes identifying 604, within the first SL resource pool, corresponding resources that overlap with the reserved resources of the second SL resource pool.

The method 600 further includes selecting 606, from the first SL resource pool, one or more transmission resources to use for a SL transmission on the first RAT by prioritizing resources of the first SL resource pool that are not the corresponding resources.

The method 600 further includes performing 608 the SL transmission using the one or more transmission resources.

In some embodiments of the method 600, the selecting prioritizes the resources of the first SL resource pool that are not the corresponding resources by not selecting for the one or more transmission resources from the corresponding resources.

In some embodiments of the method 600, the resource reservation information is received according to a periodicity used by the peer UE.

In some embodiments, the method 600 further includes providing, to the peer UE using SL on the first RAT, a trigger for sending the resource reservation information. In some such embodiments, the trigger is provided as one of a PC5 radio resource control (RRC) configuration and sidelink channel information (SCI). In some such embodiments, the trigger is provided according to a priority of data of the SL transmission.

Embodiments contemplated herein include an apparatus comprising means to perform one or more elements of the method 600. This apparatus may be, for example, an apparatus of a UE (such as a first wireless device 802 that is a UE, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a UE (such as a memory 806 of a first wireless device 802 that is a UE, as described herein).

Embodiments contemplated herein include an apparatus comprising logic, modules, or circuitry to perform one or more elements of the method 600. This apparatus may be, for example, an apparatus of a UE (such as a first wireless device 802 that is a UE, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a UE (such as a first wireless device 802 that is a UE, as described herein).

Embodiments contemplated herein include a signal as described in or related to one or more elements of the method 600.

Embodiments contemplated herein include a computer program or computer program product comprising instructions, wherein execution of the program by a processor is to cause the processor to carry out one or more elements of the method 600. The processor may be a processor of a UE (such as a processor(s) 804 of a first wireless device 802 that is a UE, as described herein). These instructions may be, for example, located in the processor and/or on a memory of the UE (such as a memory 806 of a first wireless device 802 that is a UE, as described herein).

Figure 7:
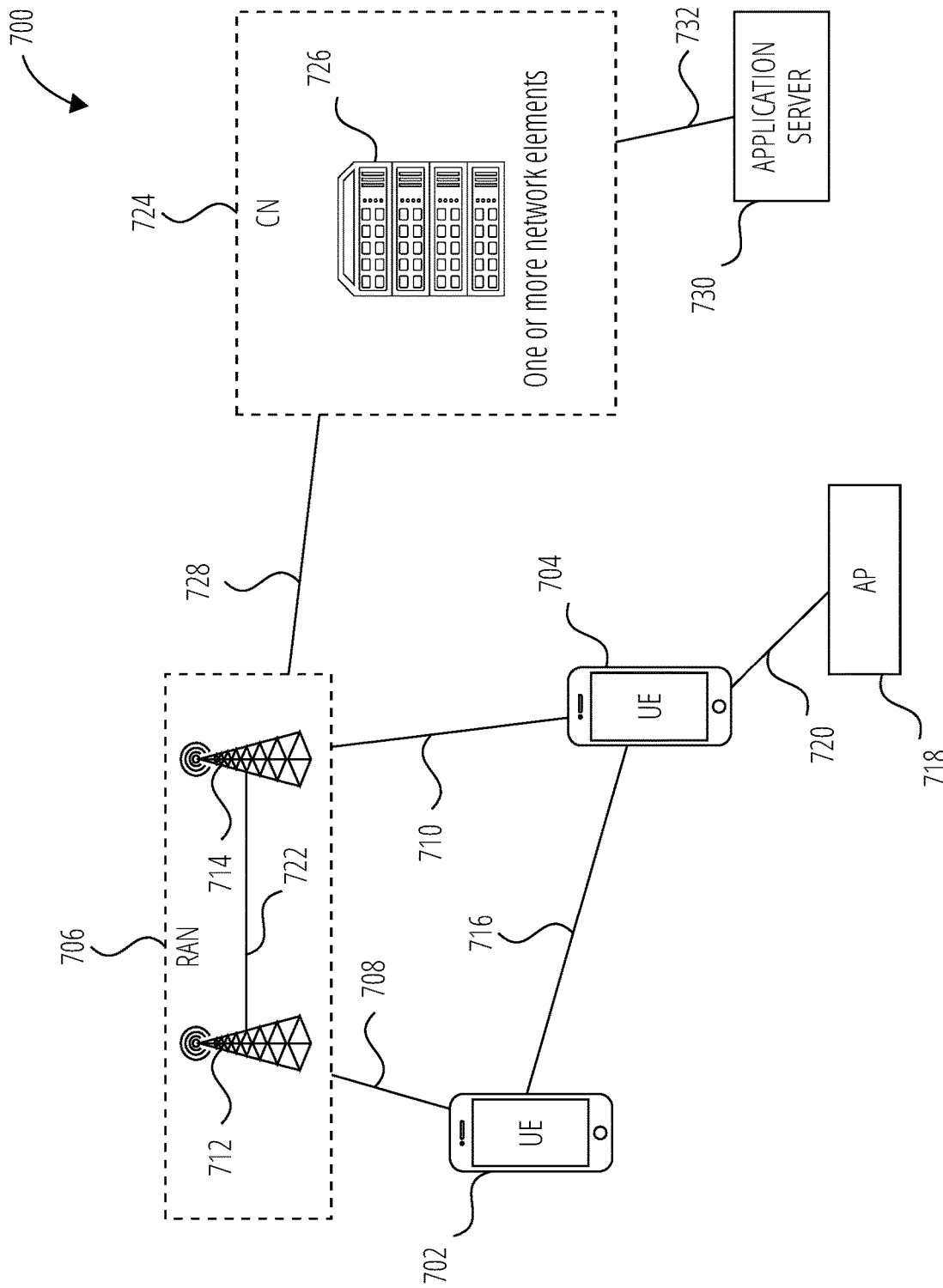
FIG. 7 illustrates an example architecture of a wireless communication system, according to embodiments disclosed herein.

FIG. 7 illustrates an example architecture of a wireless communication system 700, according to embodiments disclosed herein. The following description is provided for an example wireless communication system 700 that operates in conjunction with the LTE system standards and/or 5G or NR system standards as provided by 3GPP technical specifications.

As shown by FIG. 7, the wireless communication system 700 includes UE 702 and UE 704 (although any number of UEs may be used). In this example, the UE 702 and the UE 704 are illustrated as smartphones (e.g., handheld touchscreen mobile computing devices connectable to one or more cellular networks), but may also comprise any mobile or non-mobile computing device configured for wireless communication.

The UE 702 and UE 704 may be configured to communicatively couple with a RAN 706. In embodiments, the RAN 706 may be NG-RAN, E-UTRAN, etc. The UE 702 and UE 704 utilize connections (or channels) (shown as connection 708 and connection 710, respectively) with the RAN 706, each of which comprises a physical communications interface. The RAN 706 can include one or more base stations, such as base station 712 and base station 714, that enable the connection 708 and connection 710.

In this example, the connection 708 and connection 710 are air interfaces to enable such communicative coupling, and may be consistent with RAT(s) used by the RAN 706, such as, for example, an LTE and/or NR.

In some embodiments, the UE 702 and UE 704 may also directly exchange communication data via a sidelink interface 716. The UE 704 is shown to be configured to access an access point (shown as AP 718) via connection 720. By way of example, the connection 720 can comprise a local wireless connection, such as a connection consistent with any IEEE 602.11 protocol, wherein the AP 718 may comprise a Wi-Fi® router. In this example, the AP 718 may be connected to another network (for example, the Internet) without going through a CN 724.

In embodiments, the UE 702 and UE 704 can be configured to communicate using orthogonal frequency division multiplexing (OFDM) communication signals with each other or with the base station 712 and/or the base station 714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 712 or base station 714 may be implemented as one or more software entities running on server computers as part of a virtual network. In addition, or in other embodiments, the base station 712 or base station 714 may be configured to communicate with one another via interface 722. In embodiments where the wireless communication system 700 is an LTE system (e.g., when the CN 724 is an EPC), the interface 722 may be an X2 interface. The X2 interface may be defined between two or more base stations (e.g., two or more eNBs and the like) that connect to an EPC, and/or between two eNBs connecting to the EPC. In embodiments where the wireless communication system 700 is an NR system (e.g., when CN 724 is a 5GC), the interface 722 may be an Xn interface. The Xn interface is defined between two or more base stations (e.g., two or more gNBs and the like) that connect to between a base station 712 (e.g., a gNB) connecting to 5GC and an eNB, and/or between two eNBs connecting to 5GC (e.g., CN 724).

The RAN 706 is shown to be communicatively coupled to the CN 724. The CN 724 may comprise one or more network elements 726, which are configured to offer various data and telecommunications services to customers/subscribers (e.g., users of UE 702 and UE 704) who are connected to the CN 724 via the RAN 706. The components of the CN 724 may be implemented in one physical device or separate physical devices including components to read and execute instructions from a machine-readable or computer-readable medium (e.g., a non-transitory machine-readable storage medium).

In embodiments, the CN 724 may be an EPC, and the RAN 706 may be connected with the CN 724 via an S1 interface 728. In embodiments, the S1 interface 728 may be split into two parts, an S1 user plane (S 1-U) interface, which carries traffic data between the base station 712 or base station 714 and a serving gateway (S-GW), and the S1-MME interface, which is a signaling interface between the base station 712 or base station 714 and mobility management entities (MMEs).

In embodiments, the CN 724 may be a 5GC, and the RAN 706 may be connected with the CN 724 via an NG interface 728. In embodiments, the NG interface 728 may be split into two parts, an NG user plane (NG-U) interface, which carries traffic data between the base station 712 or base station 714 and a user plane function (UPF), and the S1 control plane (NG-C) interface, which is a signaling interface between the base station 712 or base station 714 and access and mobility management functions (AMFs).

Generally, an application server 730 may be an element offering applications that use internet protocol (IP) bearer resources with the CN 724 (e.g., packet switched data services). The application server 730 can also be configured to support one or more communication services (e.g., VoIP sessions, group communication sessions, etc.) for the UE 702 and UE 704 via the CN 724. The application server 730 may communicate with the CN 724 through an IP communications interface 732.

Figure 8:
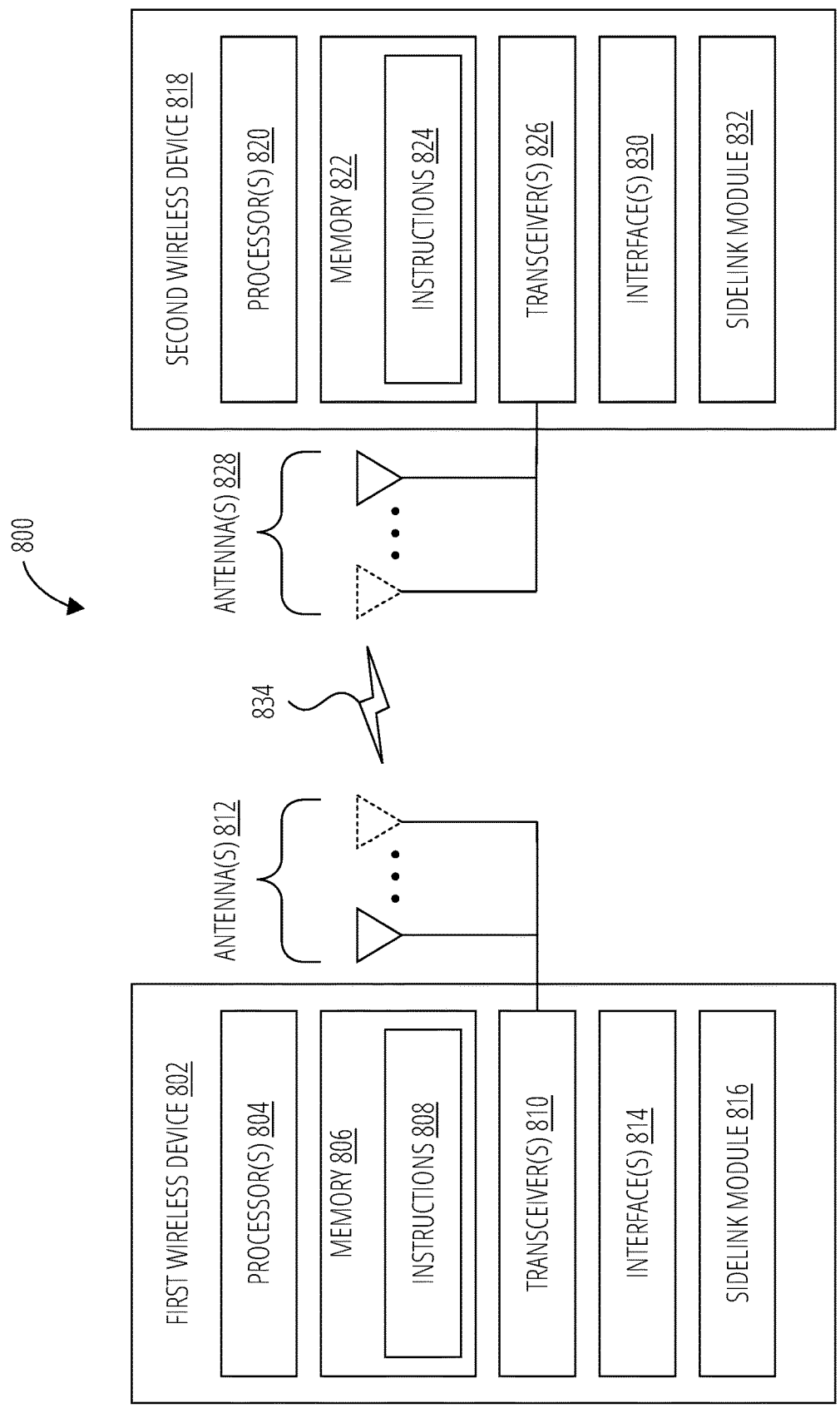
FIG. 8 illustrates a system for performing signaling between a first wireless device and a second wireless device, according to embodiments disclosed herein.

FIG. 8 illustrates a system 800 for performing signaling 834 between a first wireless device 802 and a second wireless device 818, according to embodiments disclosed herein. The system 800 may be a portion of a wireless communications system as herein described. The first wireless device 802 may be, for example, a UE of a wireless communication system. The second wireless device 818 may be, for example, a UE of the wireless communication system.

The first wireless device 802 may include one or more processor(s) 804. The processor(s) 804 may execute instructions such that various operations of the first wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The first wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The first wireless device 802 may include one or more transceiver(s) 810 that may include radio frequency (RF) transmitter and/or receiver circuitry that use the antenna(s) 812 of the first wireless device 802 to facilitate signaling (e.g., the signaling 834) to and/or from the first wireless device 802 with other devices (e.g., the second wireless device 818) according to corresponding RATs.

The first wireless device 802 may include one or more antenna(s) 812 (e.g., one, two, four, or more). For embodiments with multiple antenna(s) 812, the first wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 802 may be accomplished according to precoding (or digital beamforming) that is applied at the first wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The first wireless device 802 may include one or more interface(s) 814. The interface(s) 814 may be used to provide input to or output from the first wireless device 802. For example, a first wireless device 802 that is a UE may include interface(s) 814 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The first wireless device 802 may include a sidelink module 816. The sidelink module 816 may be implemented via hardware, software, or combinations thereof. For example, the sidelink module 816 may be implemented as a processor, circuit, and/or instructions 808 stored in the memory 806 and executed by the processor(s) 804. In some examples, the sidelink module 816 may be integrated within the processor(s) 804 and/or the transceiver(s) 810. For example, the sidelink module 816 may be implemented by a combination of software components (e.g., executed by a DSP or a general processor) and hardware components (e.g., logic gates and circuitry) within the processor(s) 804 or the transceiver(s) 810.

The sidelink module 816 may be used for various aspects of the present disclosure, for example, aspects of FIG. 3 through FIG. 6. When the first wireless device 802 is operating as a helper UE, the sidelink module 816 may be configured to cause the first wireless device 802 to sense for one or more resources of an LTE SL resource pool that are reserved and report corresponding resource reservation information to a transmitting UE operating on an NR SL resource pool. When the first wireless device 802 is operating as a transmitting UE, the sidelink module 816 may be configured to cause the first wireless device 802 to receive resource reservation information corresponding to resource reservations of an LTE SL resource pool from a helper UE, and further to select resources for a SL transmission performed by the first wireless device 802 on an NR SL resource pool in view of this resource reservation information.

The second wireless device 818 may include one or more processor(s) 820. The processor(s) 820 may execute instructions such that various operations of the second wireless device 818 are performed, as described herein. The processor(s) 820 may include one or more baseband processors implemented using, for example, a CPU, a DSP, an ASIC, a controller, an FPGA device, another hardware device, a firmware device, or any combination thereof configured to perform the operations described herein.

The second wireless device 818 may include a memory 822. The memory 822 may be a non-transitory computer-readable storage medium that stores instructions 824 (which may include, for example, the instructions being executed by the processor(s) 820). The instructions 824 may also be referred to as program code or a computer program. The memory 822 may also store data used by, and results computed by, the processor(s) 820.

The second wireless device 818 may include one or more transceiver(s) 826 that may include RF transmitter and/or receiver circuitry that use the antenna(s) 828 of the second wireless device 818 to facilitate signaling (e.g., the signaling 834) to and/or from the second wireless device 818 with other devices (e.g., the first wireless device 802) according to corresponding RATs.

The second wireless device 818 may include one or more antenna(s) 828 (e.g., one, two, four, or more). In embodiments having multiple antenna(s) 828, the second wireless device 818 may perform MIMO, digital beamforming, analog beamforming, beam steering, etc., as has been described.

The second wireless device 818 may include one or more interface(s) 830. The interface(s) 830 may be used to provide input to or output from the second wireless device 818. For example, a second wireless device 818 that is a UE may include interface(s) 830 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 826/antenna(s) 828 already described) that allow for communication between the UE and other devices and may operate according to known protocols (e.g., Wi-Fi®, Bluetooth®, and the like).

The second wireless device 818 may include a sidelink module 832. The sidelink module 832 may be implemented via hardware, software, or combinations thereof. For example, the sidelink module 832 may be implemented as a processor, circuit, and/or instructions 824 stored in the memory 822 and executed by the processor(s) 820. In some examples, the sidelink module 832 may be integrated within the processor(s) 820 and/or the transceiver(s) 826. For example, the sidelink module 832 may be implemented by a combination of software components (e.g., executed by a DSP or a general processor) and hardware components (e.g., logic gates and circuitry) within the processor(s) 820 or the transceiver(s) 826.

The sidelink module 832 may be used for various aspects of the present disclosure, for example, aspects of FIG. 3 through FIG. 6. When the second wireless device 818 is operating as a helper UE, the sidelink module 832 may be configured to cause the second wireless device 818 to sense for one or more resources of an LTE SL resource pool that are reserved and report corresponding resource reservation information to a transmitting UE operating on an NR SL resource pool. When the second wireless device 818 is operating as a transmitting UE, the sidelink module 832 may be configured to cause the second wireless device 818 to receive resource reservation information corresponding to resource reservations of an LTE SL resource pool from a helper UE, and further to select resources for a SL transmission performed by the second wireless device 818 on an NR SL resource pool in view of this resource reservation information.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
identifying that a first portion of a first sidelink (SL) resource pool on a first radio access technology (RAT) overlaps with a portion of a second SL resource pool on a second RAT, the first portion of the first SL resource pool comprising first resources and the portion of the second SL resource pool comprising second resources;
sensing first reservation signaling of the second SL resource pool on the second RAT to determine first reserved resources of the second resources; and
transmitting resource reservation information on SL on the first RAT, the resource reservation information indicating that the first reserved resources are reserved.

2. The method of claim 1, further comprising:
sensing second reservation signaling of the first SL resource pool on the first RAT to determine second reserved resources from the first SL resource pool;
wherein the resource reservation information further indicates that the second reserved resources are reserved.

3. The method of claim 1, wherein the first reservation signaling comprises reservation signaling of only the portion of the second SL resource pool.

4. The method of claim 1, wherein the resource reservation information is transmitted when a resource pool configuration for the first SL resource pool indicates that the UE should transmit the resource reservation information.

5. The method of claim 1, wherein the resource reservation information is transmitted in response to a trigger provided by a peer UE using SL on the first RAT, the trigger being provided as of one of a PC5 radio resource control (RRC) configuration and sidelink channel information (SCI).

6. The method of claim 1, wherein the resource reservation information is transmitted according to a periodicity known to the UE.

7. The method of claim 1, wherein the resource reservation information is transmitted in response to a trigger from a peer UE.

8. The method of claim 1, wherein the resource reservation information is transmitted on one or more resources of a second portion of the first SL resource pool that does not overlap with the second SL resource pool.

9. The method of claim 1, wherein the resource reservation information is transmitted on one or more dedicated resources of the first SL resource pool.

10. The method of claim 1, wherein the resource reservation information is transmitted on one or more dynamically selected resources of the first SL resource pool.

11. The method of claim 10, wherein the resource reservation information is of a priority level that is pre-configured relative to the first SL resource pool.

12. The method of claim 10, wherein the resource reservation information is of a pre-defined priority level.

13. The method of claim 1, wherein the resource reservation information uses a resource bitmap to indicate that the first reserved resources are reserved, wherein a bit of the resource bitmap corresponds to a time of one of the second resources on the second RAT and a frequency of the one of the second resources on the second RAT.

14. The method of claim 13, wherein the resource bitmap includes only bits for the second resources that occur during a window of a length that is defined in configuration information for the first SL resource pool.

15. The method of claim 1, wherein the resource reservation information is transmitted in a physical sidelink shared channel (PSSCH), and further comprising transmitting an indication that the PSSCH comprises the resource reservation information.

16. The method of claim 15, wherein the indication is transmitted in stage 1 sidelink control information (SCI) corresponding to the PSSCH.

17. The method of claim 15, wherein the indication is transmitted in stage 2 sidelink control information (SCI) corresponding to the PSSCH.

18. The method of claim 15, wherein the indication is transmitted in a medium access control control element (MAC CE) corresponding to the PSSCH.

* * * * *